INVENTOR.
H. F. MAY

July 12, 1949.      H. F. MAY      2,475,848
SYSTEM FOR AUTOMATIC TRANSMISSION OF MESSAGES
BETWEEN FLIGHT PROGRESS BOARDS AND AIRCRAFT
Filed Aug. 4, 1945                    9 Sheets-Sheet 8
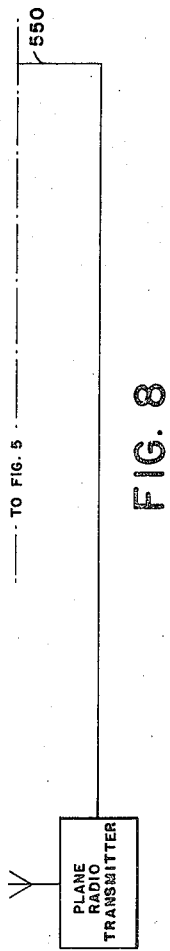
FIG. 8
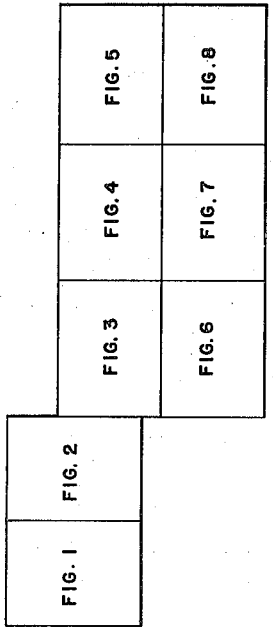
FIG. 11
FIG. 10
| RECEIVING DATA CODE | |
|---|---|
| 0 | 345 |
| 1 | 245 |
| 2 | 235 |
| 3 | 234 |
| 4 | 145 |
| 5 | 135 |
| 6 | 134 |
| 7 | 125 |
| 8 | 124 |
| 9 | 123 |
| TRANS | 3 |
| SPACE | 6 |
FIG. 9
| TRANS. SEL. & DATA CODE AND RECEIVING SEL. CODE | |
|---|---|
| CONDITION | |
| 0 | 16 |
| 1 | 12 |
| 2 | 13 |
| 3 | 14 |
| 4 | 15 |
| 5 | 23 |
| 6 | 24 |
| 7 | 25 |
| 8 | 34 |
| 9 | 35 |
| LOCK | 45 |
| | 26 |
INVENTOR.
H. F. MAY
BY
JEF Presson
ATTORNEY.

Patented July 12, 1949

2,475,848

UNITED STATES PATENT OFFICE 2,475,848

SYSTEM FOR AUTOMATIC TRANSMISSION OF MESSAGES BETWEEN FLIGHT PROGRESS BOARDS AND AIRCRAFT

Harold F. May, Valley Stream, N. Y., assignor to The Teleregister Corporation, New York, N. Y., a corporation of Delaware Application August 4, 1945, Serial No. 608,892

18 Claims. (Cl. 177—353)

This invention relates to communication and posting systems in which information or data in regard to a number of different items, for example, various aircraft, are displayed on announcing boards by means of indicators which are automatically and selectively actuatable or settable in response to incoming signals to display information or current changes in information in regard to the various aircraft or other items posted. The invention is particularly adapted to the recordation and posting of data at an airport or other air traffic control center and the selective retransmission automatically to aircraft en route, of certain of the posted data at predetermined times and visually displaying in the selected aircraft the data thus retransmitted.

The system disclosed herein is an extension of, and an addition to, the communication and posting systems disclosed in the Marshall et al. Patent No. 2,246,449, May et al. Patent No. 2,386,743, and Marshall et al. Patent No. 2,391,469. In order to simplify the present disclosure and to set forth more clearly the improvements represented by the instant invention, certain of the apparatus and equipment in the aforesaid patents are diagrammatically represented in the drawings of the instant case, the disclosures of the aforesaid patents being incorporated herein by reference.

In systems for recording or posting flight plans and flight progress reports of aircraft and other messages relative to the control or aircraft, the information thus posted on the bulletin or announcing board at the airport or other control center relates to numerous flights which may be identified by numbers or other characters, and the indicators on which the items are posted are arranged in groups corresponding to the various "marker" or "Fix" classifications, and preferably are arranged within each Fix group in accordance with the expected or estimated time of passage or arrival of the aircraft at the various recording or "marker" points en route and at the airport. The flight data posted usually has to be changed from time to time during the progress of the flights as the result of conditions affecting the progress of the aircraft, routing changes, and other circumstances.

The information posted may comprise numerous data such as the flight designation numbers, information as to the direction of the various flights, the estimated time when the aircraft will pass over or land at certain marker points along the flight route, the time at which the aircraft actually passes over or lands at various marker points, the proposed altitude at which a clearance is to be or has been issued to cross each marker or flight path, the altitude at which the aircraft actually crosses the various markers or flight paths, and other information referred to in the aforesaid patents. As there disclosed, a record board is provided having electrical signal storage devices, such as storage relays, rotatable indicators and settable switch banks, on which control data and other information in regard to the various flights may be stored in random order on the board. Also, there may be provided a display board having rotatable indicating devices for displaying information in regard to the flights, and sequencing apparatus controlled by the signal storage devices of the record board for obtaining information therefrom and automatically selecting and energizing the indicators on the display board to cause them to display in a predetermined serial order the items of information stored on the record board.

In Patent 2,386,743 the order in which the items are either posted initially or rewritten on the display board is determined by the settings of new position storage devices which are manually set by an attendant who determines the desired serial arrangement of the flights to be displayed or rewritten on the display board, whereas in Patent 2,391,469, the new position storage devices are automatically set by the incoming flight signals to effect a desired serial order of flights when the display board is rewritten, in accordance with the relative values of the incoming data concerning the flights, which data, for example, may represent altitude or time.

The instant invention makes the ground-to-plane communications link automatic, by the transmission at the proper times of control data such as routine clearance instructions to the pilots of the various planes within a given control zone, and thus the automatic communication and control equipment of the aforesaid patents is expanded to provide links between planes and ground station radio transmitters and associated receivers, apparatus being provided in the planes to receive control data signals and translate and visually post the data on indicators before the pilot. Each plane under control is listed in various Fix sections of the flight progress boards in accordance with the airways to be followed throughout its flight, the altitudes and estimated arrival times being shown for all planes at all Fixes. If the pilot of a plane en route could look into the control room and see the flight progress display board in the immediate control zone, it would of course be unnecessary to send clearance instructions to him either by voice or other means. Since he cannot do this, the present invention takes certain information from the proper flight progress board and puts it into the cockpit where the pilot can see it. As an added convenience for the pilot, the system sends out at any one time only that portion of the posted information which concerns the immediate conduct of his own flight. Controllers may plan well in advance and may post their clearance notations and revise them when required, but each pilot receives instructions only at the times when he must verify or alter his conduct of the flight.

The equipment in the plane is arranged so that only instructions preceded by the individual identification number of the plane will actuate the pilot's clearance indicator, which indicator shows, by means of a drum or a calibrated dial or other desired type of display, the altitude to be flown and preferably other instructions such as Hold, Cleared to Land, etc. The system also includes means for calling the pilot's attention to a change in instructions, and manual means is provided, such as a button to be pushed by the pilot, to acknowledge instructions. When the pilot pushes his acknowledgment button, the clearance indicator in his plane is connected to the controls of a transmitter, and the clearance as observed by the pilot is automatically repeated back to a receiver on the ground. There the system compares the acknowledgment with the original clearance and, if a discrepancy is found, causes a repeat transmission to the plane. Should no satisfactory acknowledgment be received from a plane within a given time after the original transmission, the flight progress board storing device associated with that plane is energized and a controller may then contact the pilot by voice radio or otherwise. Various possible conditions for initiating a transmission to a given plane may be employed, such as (1) the posting of any control data code for a Fix for which an "Over time" has already been posted, (2) when the actual time approaches within a given number of minutes of an estimate for a Fix, provided the control data code or proposed altitude at that Fix is different from the corresponding figure for the previous Fix, (3) posting of a flight progress report, and (4) posting of a "Hold" code for a Fix which will be the next one reached by the aircraft. By means of the automatic features of the system disclosed herein, the work load on controllers, radio communicators and pilots is greatly reduced—the controllers determine and post the necessary control data, but no longer have to telephone the clearances to effect their delivery, thus gaining time for other duties; also, the communicators do not have to handle clearances and thus are enabled to give more time to other duties; the pilots receive and acknowledge clearances without having to do more than touch a button, since the record is in front of them with no necessity for copying down codes or keeping track of flight changes to be made at some future time; and there is eliminated the time lag occasioned by the procedures necessary to voice communication. Moreover, the elimination of the spoken word in transmitting reports from aircraft in flight and in sending clearance instructions to them is of considerable importance now that extensive international traffic is expected. The actual radio codes transmitted to and from planes automatically originate in and are received by mechanisms, and hence no problem of language need arise. Only on the flight progress boards and on the pilots' clearance indicators is there any need for human understanding, and these externals require only labeling in any desired language to make them understandable to the user. Thus, American operated planes can send out automatic progress reports over foreign countries, and the reports will be posted intelligibly for the airway traffic controllers of those countries. Similarly, a pilot of foreign nationality flying over the United States will see his instructions displayed in his own language.

One of the objects of the invention is a system for automatically transmitting flight control data such as clearance instructions or other items of information stored on a flight progress board at a control center, to a particular plane or other aircraft at various desired times, for example, at the time when the aircraft has reached a certain location in its flight with respect to a particular Fix or other marker along the flight route.

Another object of the invention is means for automatically receiving and visually posting flight control data on indicators within the aircraft to which the data is pertinent, whereby the pilot has his instructions automatically displayed, and without having to initiate a request for the same.

A further object is a system of the character disclosed in which pilots in aircraft receive and acknowledge clearances and other information without having to perform any manual operation other than that of initiating the transmission of an acknowledgment which then proceeds automatically.

Still another object is a system which eliminates the need for pilots to copy or memorize clearances or other instructions and in which instructions for the immediate conduct of the flight are always posted before them.

Another object is to cause a position report comprising posting signals to be transmitted from an aircraft automatically upon the occurrence of certain conditions relating to its position en route.

An additional object is a system which obviates the necessity for controllers and radio communicators to speak clearances thereby avoiding the possibility of misunderstanding on the part of the pilots, and also eliminating the possibility of human error which is present when the spoken word is relied upon for communication.

Various other objects, advantages and improvements will be apparent from the following detailed description of an illustrative embodiment of the invention, taken in connection with the accompanying drawings, in which:

Figs. 1 and 2 together comprise a view, partly in diagrammatic form, of rows of Fix, identification, time and altitude storage indicators in a flight progress record board at a control center, with cooperating storage relays and certain time-controlled apparatus for initiating transmission of clearances and other data to particular aircraft;

Figure 5:
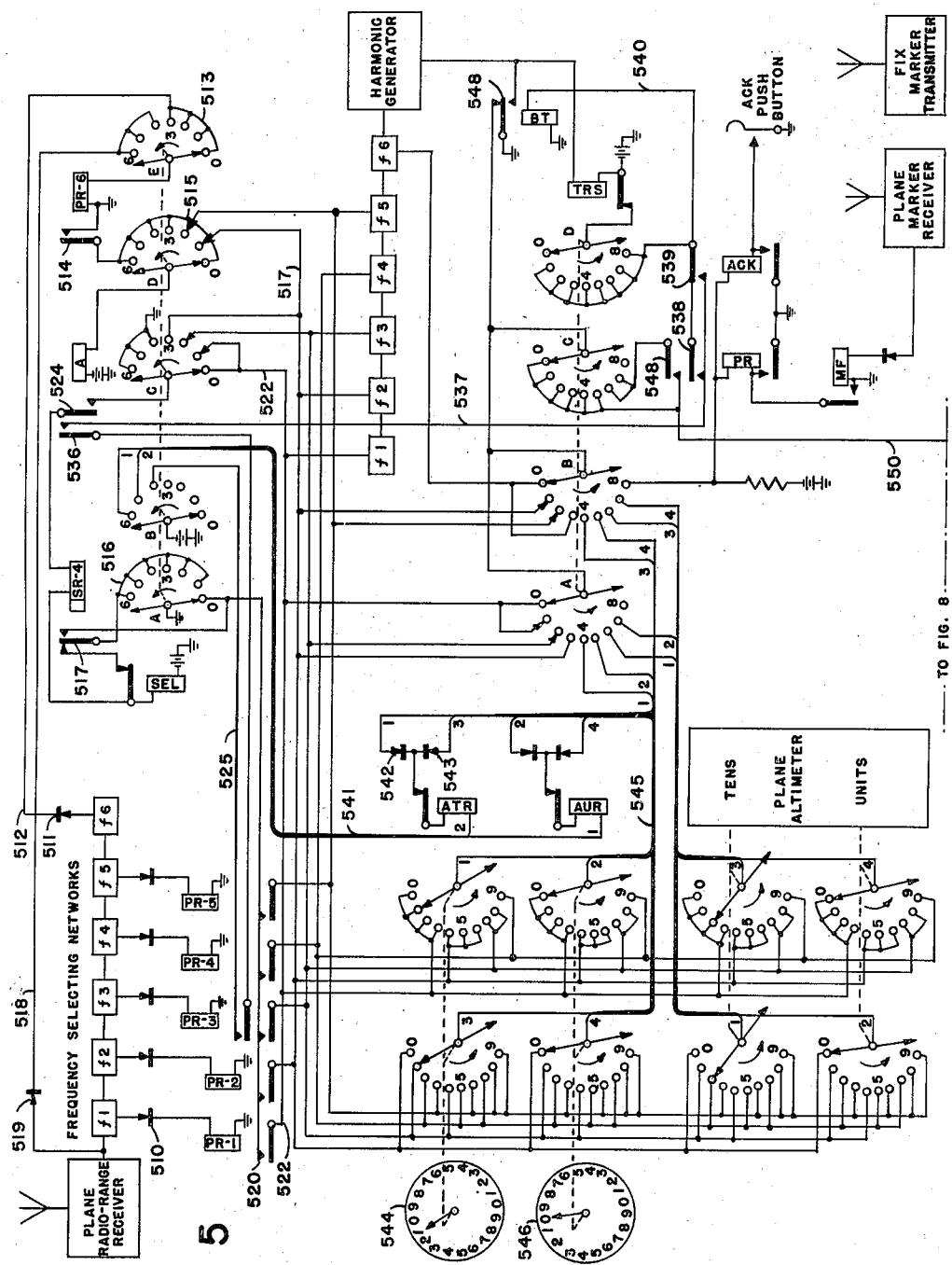
Fig. 5 shows radio receiving and posting apparatus in an aircraft, responsive to the signals transmitted by the equipment of Fig. 4, together with apparatus for transmitting an acknowledgment of the data received by the aircraft.
Figure 12:
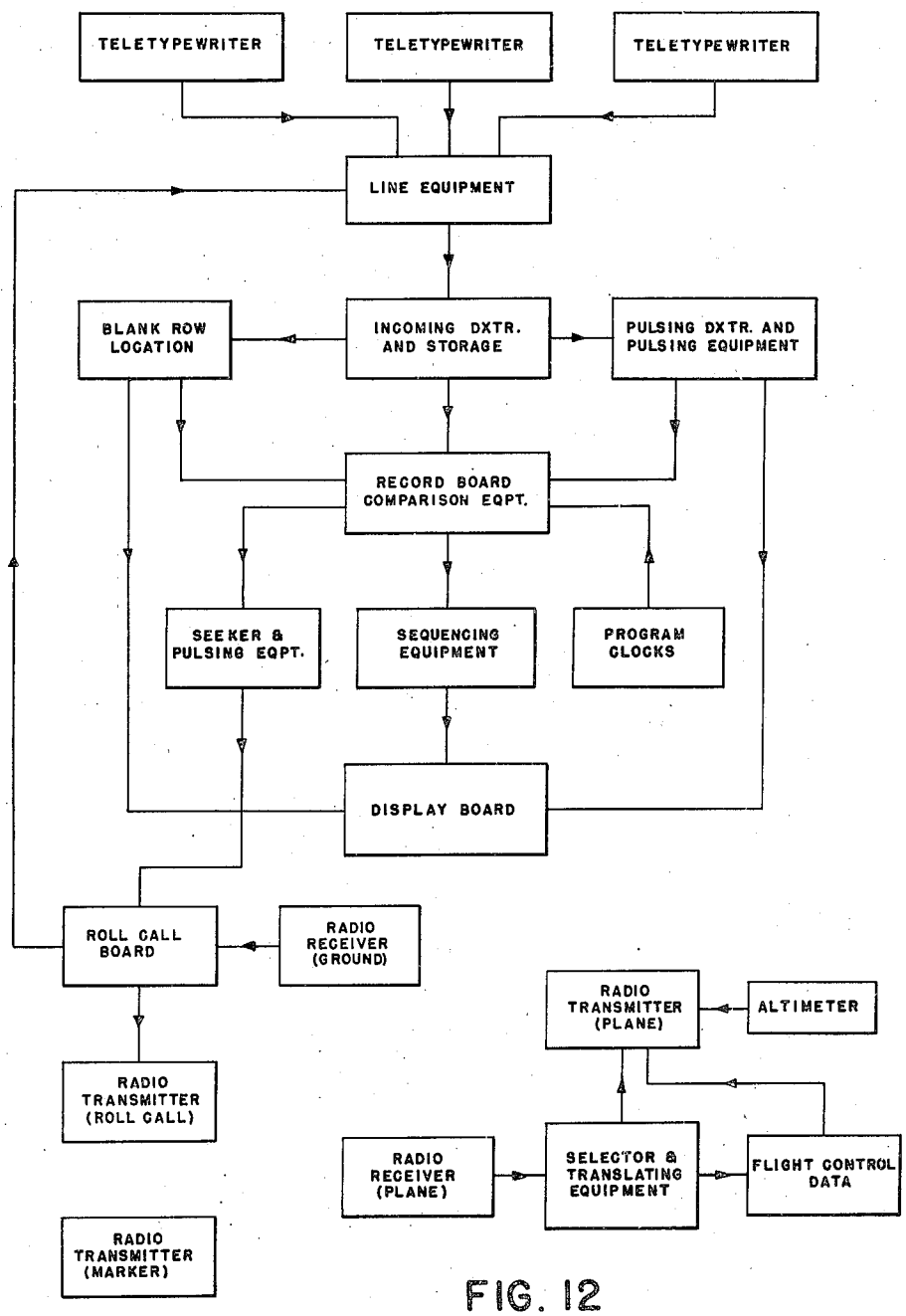

Fig. 8 diagrammatically shows a transmitter in the aircraft, associated with the apparatus of Fig. 5;

Fig. 9 is a chart showing certain combinations or permutations of several signaling frequencies which may be employed for transmitting aircraft selection and data code signals and receiving selection code signals;

Fig. 10 is a chart showing certain combination or permutations of several signaling frequencies which may be employed for receiving data code signals;

Fig. 11 is a diagram showing the arrangement of the various sheets of drawings; and Fig. 12 is a diagram showing various units of the system and their functions and operative relation with respect to each other.

In the illustrative embodiment of the invention illustrated herein, data in regard to the movements of the number of aircraft within a given area of a terminal or other control zone are electrically stored, and preferably although not necessarily, are visually posted on a record board, and are displayed in predetermined order on the display board diagrammatically shown in Fig. 12. As disclosed in detail in the aforesaid patents, the record board may be posted by incoming permutation code signals that are initiated at or retransmitted from various keyboard printer or teletypewriter transmitting stations and transmitted by wire to the line equipment associated with the record board. The received signals are applied by an incoming distributor, to groups of relay decoding and storage units and are caused to pulse the storage indicators of the record board. Record board comparison equipment, in combination with sequencing equipment, operates to reset the display board at desired intervals in accordance with the revised or current information received by the record board. Blank row location apparatus, disclosed in Patent 2,391,469, also is provided which functions when the flight locator fails to find a posted flight identification corresponding to the flight identification in an incoming message, and selects an available idle row of indicators in the record board and in the display board.

Figure 1:
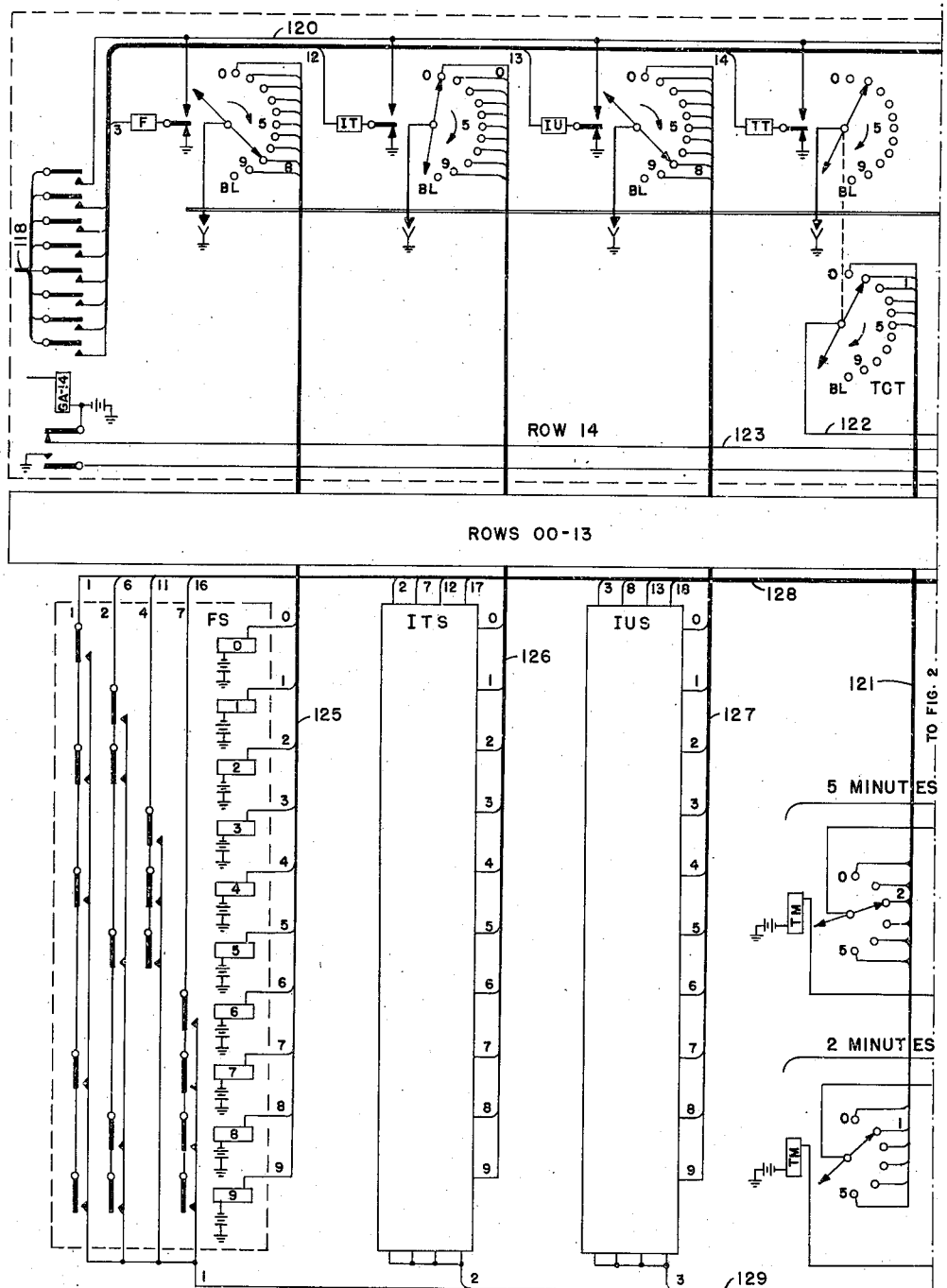
Figure 2:
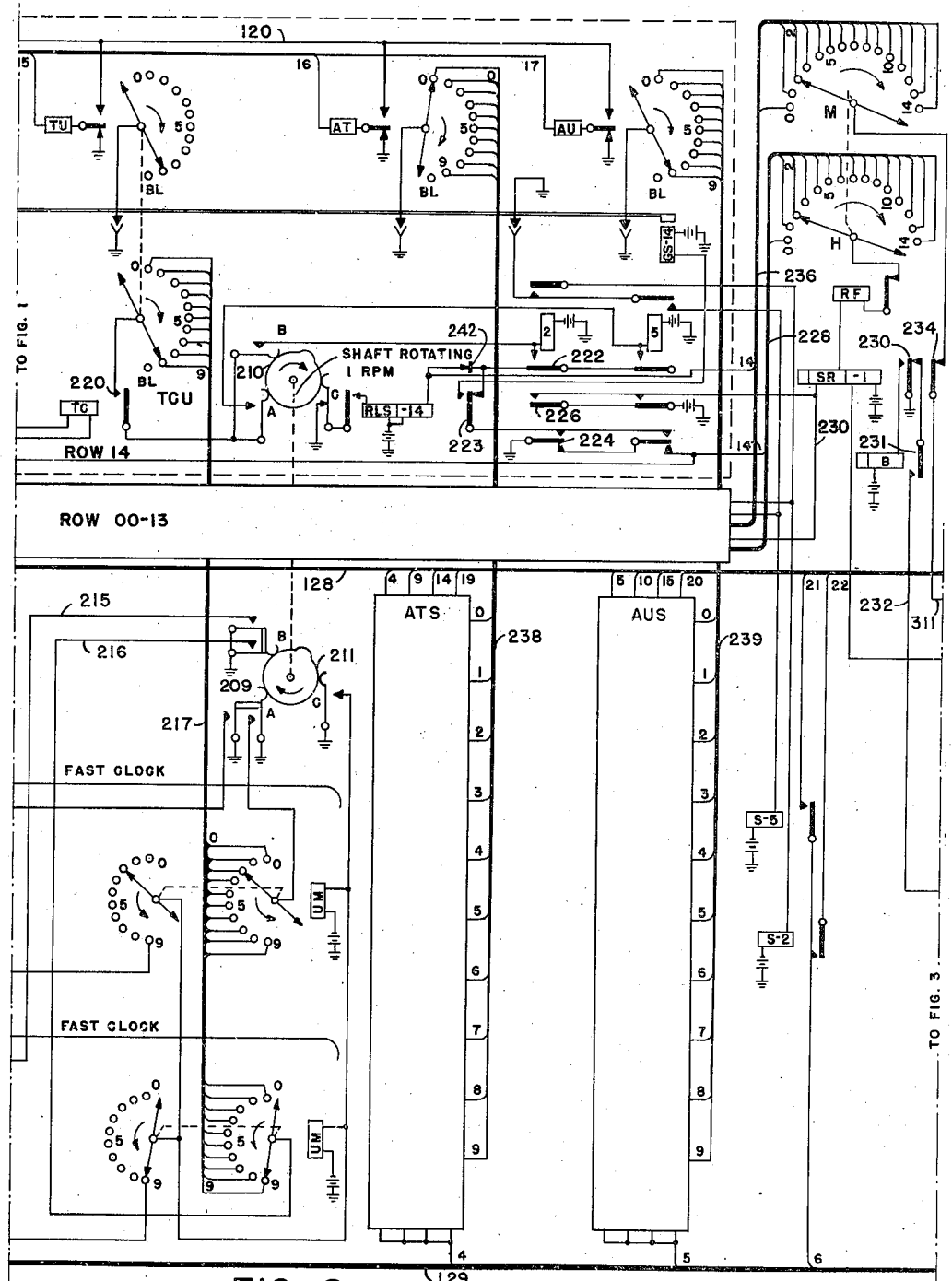

Figs. 1 and 2 of the drawings illustrate fifteen horizontal rows, designated 00 to 14, of the record board recording devices. Rotatable storage indicators F, IT, IU, TT, TU, AT and AU preferably are employed as the recording devices since they also conveniently display the stored information. Each such row of storage indicators, when identified with a particular flight, is adapted to store and display the flight identification number, a Fix number, and the flight information or data, such as the estimated and actual times at which the aircraft reaches or passes a particular location or Fix and the proposed and actual altitudes of the aircraft at the various Fixes and along the flight route. Preferably, and as set forth in Patent 2,391,469, rotatable step-by-step indicators are employed having eleven positions, and in which the digit 0 follows the blank position on the indicator drum. In this case, the number of stepping pulses necessary to actuate the indicator drum after restoration to its blank position, to any digit will be one greater than the value of the digit, and the pulse generating and transmitting equipment illustrated is designed to generate one pulse more than the number represented by the digit to be posted. It is, of course, possible to utilize other types of indicators, for example, the type in which the digit 1 follows the blank position, as disclosed in Patent 2,386,743, in which case the number of resetting pulses equal the number represented by the digit to be posted.

Since the method of posting the record board is like that employed in the aforesaid patents, the drawings herein begin with a fifteen row record board of which row 14 is shown in partial detail in Figs. 1 and 2. Let us assume that it is desired to transmit additional clearance to the pilot of a plane at a predetermined time, for example, five minutes before the plane reaches a particular Fix in order to permit it to travel beyond the Fix. This transmission will be made automatically to the particular plane, and in addition a request for an acknowledgment will be made shortly after the transmission of the clearance. For the sake of simplicity the information included in a clearance transmission has been limited to a two digit plane identification number and two digit numbers for altitude. To effect the automatic transmission at the proper times, the illustrative embodiment provides two "program" clocks designated "5 minutes fast clock" and "2 minutes fast clock," these clocks being shown in the lower portions of Figs. 1 and 2.

Two minutes before a plane reaches a given Fix, a request for a report or verification is automatically transmitted to the plane. Equipment also is provided to initiate a report from the plane in response to a request, provided the plane has passed over the radio marker identifying the Fix. Since a plane may not have passed over the Fix at the time the request or report is sent out, the request is repeated several times.

Referring again to the program clocks, the principle of using "fast" clocks is employed to initiate radio transmissions ahead of the actual times recorded in the record board. It will be recalled that the time posted in each row of the record board is the estimated time when a plane is to pass over a particular Fix, and by using several different clocks it is necessary to have only one time recorded in the record board. It is, however, essential when scanning the record board each minute for times equal to that on one of the fast clocks to know which clock is energizing the record board multiples 121, 217. To effect this, a rotating shaft carrying cams 210 and 211, Fig. 2, closes cam contacts A, B and C in each record board row in a particular Fix when connecting a clock to the record board multiples. In those rows carrying a time equal to the clock time, a relay 2 or 5, Fig. 2, is locked up. Which one of these relays is operated is determined by the particular set of cam contacts closed on cam 210 when the clock is energized. The cam shaft is rotated by any suitable driving means such as a synchronous motor, driving fork, or clock driven mechanism, at the rate of one R. P. M., and closes either the A or B contacts of cam 210 in each row of the record board as the corresponding clock is connected to the various conductors in multiples 121 and 217. The clocks are stepped ahead by rotary stepping magnets UM in Fig. 2, every minute from contact C on the cam 211. When ten minutes elapse on either of the UM contact banks, the associated TM magnet, Fig. 1, is energized once, whereby a number of clocks can be provided each of which may keep a different time suitable for timing a different operation.

The time comparison takes place twice each minute, once to compare the times stored in the various rows of the record board with that on the "5 minutes fast clock" and once to compare the times on the record board with that of the "2 minutes fast clock." The cam 211 of Fig. 2 selects either the "5 minutes fast clock" or the "2 minutes fast clock" by closing its contacts A or B respectively. Cam 210 on the same shaft closes corresponding contacts A or B to connect in relay 5 or 2 of Fig. 2, so that the appropriate one of these relays will operate if the indicators TCT, Fig. 1, and TCU, Fig. 2, in the various rows of the record board have stored therein a time equal to that of the clock being used at that instant. The record board is initially posted at the time any information on each flight is available, the time indicators TCT and TCU being set in accordance with an estimate which is made by a controller in reviewing the flight plan.

Assume, for example, that the "2 minutes fast clock" shows 19 minutes, as indicated by the bank wipers in Figs. 1 and 2, and that row 14 of the record board has nineteen minutes posted on the TT (time tens) and TU (time units) recording indicators, as illustrated. When contacts B on cam 211 closed (Fig. 2 shows the cam beyond the closure point), ground 209 was supplied through contacts B and conductors 215, 216 to the contact bank wipers of the "2 minutes fast clock." The wipers extended the ground, through multiple 121, to the contact 1 of all TT indicator contact banks TCT (time comparison tens) and through cable 217 to contact 9 of all TU indicator contact banks TCU (time comparison units) in the record board. In row 14 the "time tens" ground was extended through the bank TCT of the TT recording unit and conductor 122, through the winding of the tens comparison relay TC and conductor 123 and inner armature and break contact on a gang relay GA—14 to battery, operating relay TC. The record board gang relay GA—14, which connects the record board indicators of that row to pulsing circuits so that an incoming message can be stored on the indicators, is shown only in partial detail, with but a few of its armatures and connections 118, since these are fully disclosed in the aforesaid Patents 2,386,743 and 2,391,469 and a detailed disclosure herein is not necessary to an understanding of the instant invention. The "time units" ground was extended through the bank TCU of the TU indicator recording unit, Fig. 2, the armature and make contact 220 of operated relay TC, contact B of cam 210, and winding of relay 2 to grounded battery. Relay 2 operates and locks up through its lower inner make contact and armature 222, and break contact and armature 223 of relay RLS—14 (which previously had been deenergized by the opening of the C contacts of cam 210) to ground on operated armature 224 and make contact of the relay 2. Whenever a relay 2 or 5 is operated in the record board of Figs. 1 and 2, the information on that flight is transferred to the roll call board, Fig. 3, which carries data on all flights to be communicated with.

Figure 3:
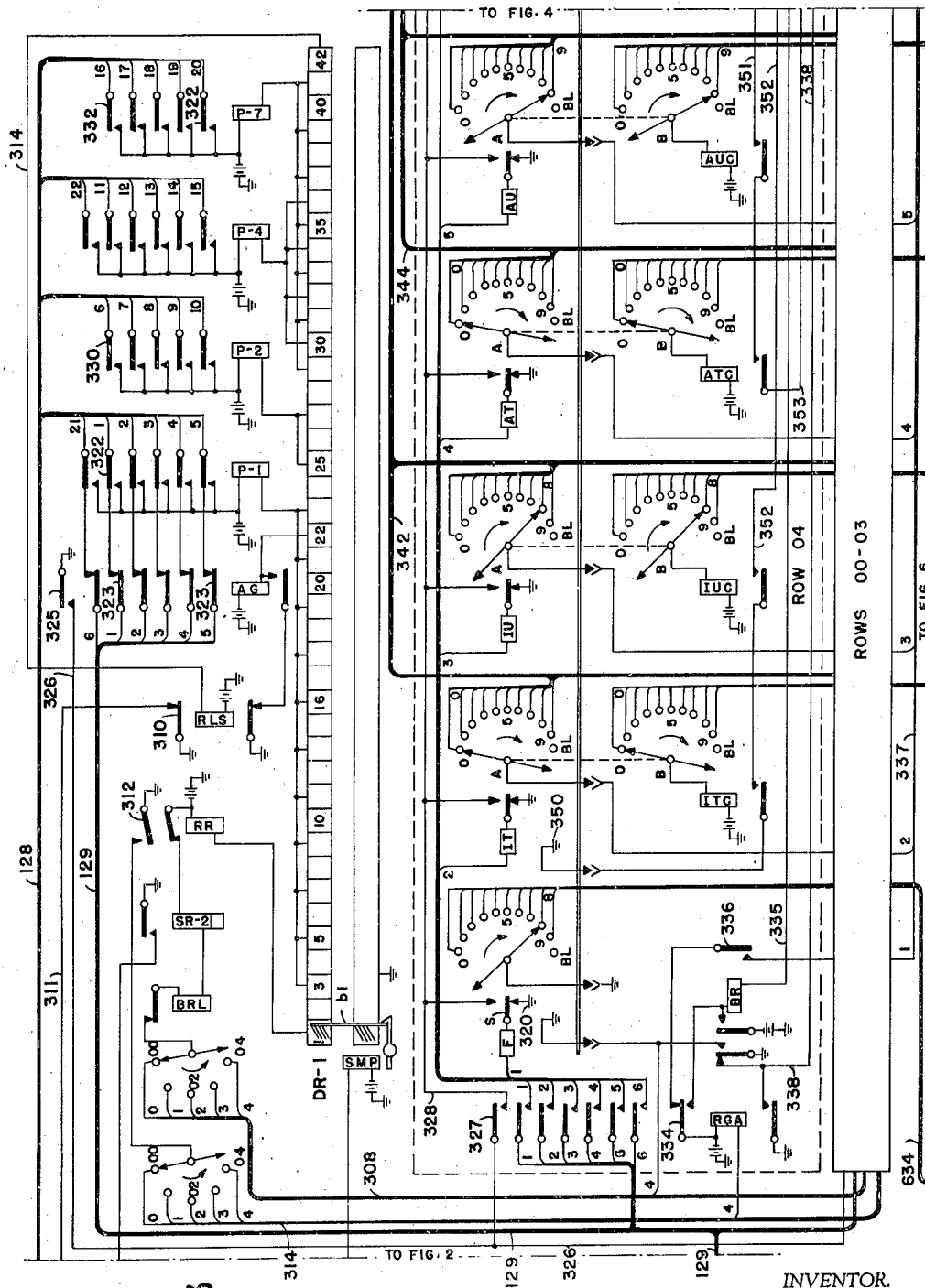
Fig. 3 shows rows of Fix, identification and altitude storage indicators in a roll call board at the control center on which the data to be retransmitted is stored, with a distributor for pulsing the storage indicators.
Figure 4:
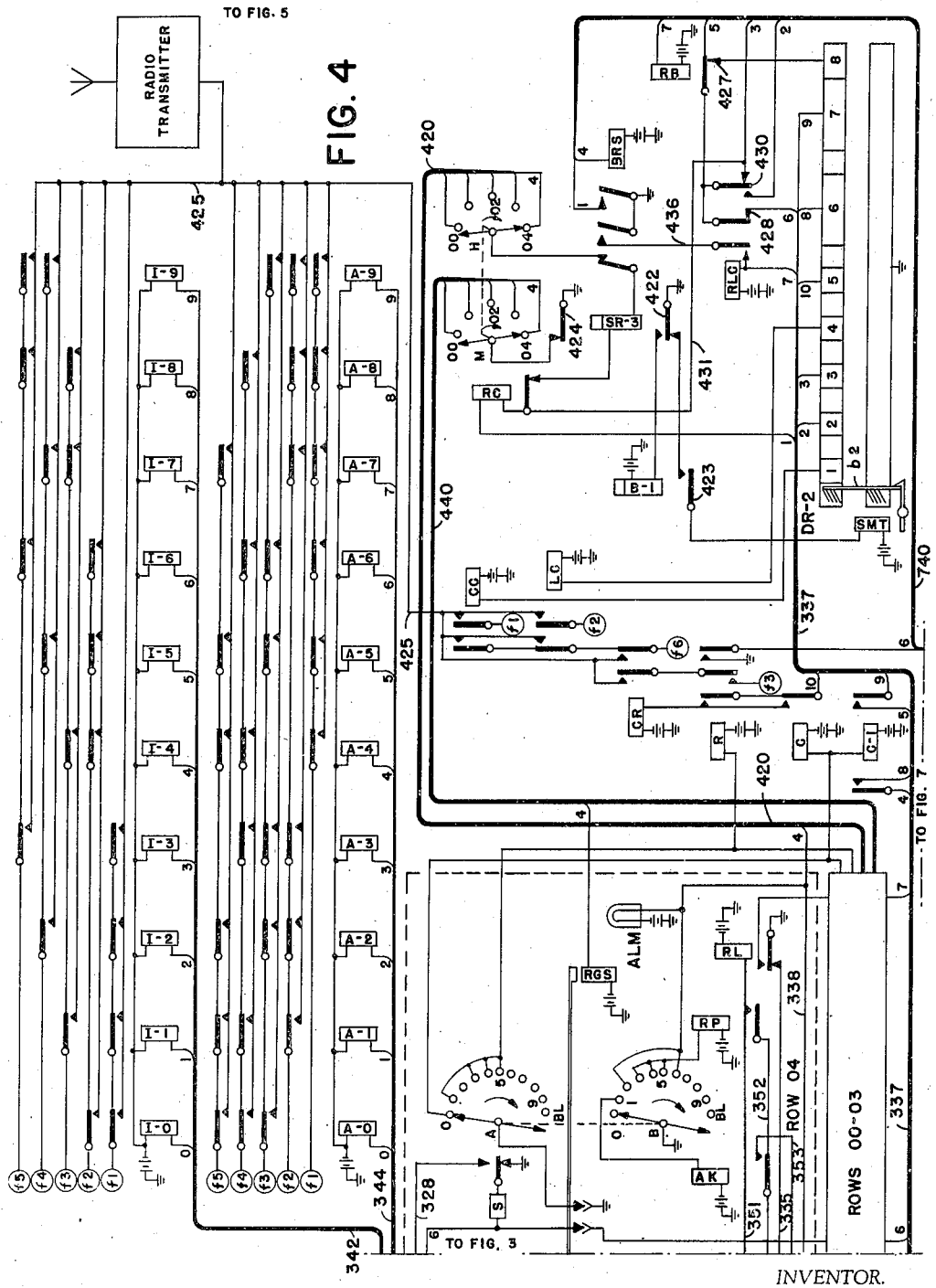
Fig. 4 shows a radio transmitter and associated equipment at the control center for transmitting in succession to various aircraft the control data posted in the roll call board of Fig. 3.

Transfer to the roll call board, Figs. 3 and 4, is effected when the rotary selector switch RF, Fig. 2, arrives at the position corresponding to the row in which either relay 2 or relay 5 has been previously operated by means of a time comparison. The selector switch RF continually hunts over the rows of the record board whenever any relay 2 or 5 is operated, as explained in detail under the following heading "Posting the roll call board."

*Posting the roll call board*

The roll call board is posted by a distributor DR—1 in conjunction with a self-interrupting rotary stepping switch RF, Fig. 2, which finds the proper row in the record board in the following manner. The operation of relay 2, at its armature 224, removed ground from terminal 14 of multiple 228 leading to the contact bank of rotary row finder switch RF so that the switch would stop at this terminal. Operated relay 2, at its armature 226 and make contact, also placed battery on a multiple wire 230 and connected through the low resistance winding of slow-release relay SR—1 to the coil of the stepping switch RF. Since the switch is arranged for buzzing operation it moves around to the first ungrounded terminal on its bank H, in this case terminal 14. The SR—1 relay, which remained operated during the buzzing operation now releases, provided its right-hand winding is not energized which would be the case if the roll call board blank row locating switch BRL, Fig. 3, was hunting. When SR—1, Fig. 2, releases it momentarily energizes start magnet SMP, Fig. 3, releasing the brush b1 of distributor DR—1, through a circuit comprising grounded armature 230 and break contact of SR—1, Fig. 2, armature 231 and make contact of the operated slow-release relay B (which was operated when relay SR—1 operated) and conductor 232 to SMP. The release of SR—1 applied ground, from grounded armature 310 and break contact of release relay RLS of Fig. 3, conductor 311, armature 234 and break contact of relay SR—1, Fig. 2, through bank M of switch RF and conductor 14 in multiple 236 (since the wiper M has come to rest on row 14), and the right-hand winding of relay RLS—14, which relay operates and locks to cam contact C of cam 210. A rectifier 242 eliminates a feed-back current path from grounded armature 224 of relay 2 upon operation of the latter relay which otherwise would cause premature operation of relay RLS—14, whereas relay RLS—14 operates only when the wiper of switch bank M reaches terminal 14 of its bank and applies ground potential to conductor 14 in cable 236. RLS—14 and its armature 223 and make contact, operates relay GS—14 which, through its armature and grounded make contacts grounds the wipers of the recording indicator units in row 14 and transfers the settings of these indicators to storage relays FS, ITS, IUS, Fig. 1, and ATS, AUS, Fig. 2.

The brush b1 of distributor DR—1 of Fig. 3, when it leaves the segment 1, releases relay RR which, through its grounded armature 312 and break contact, grounds the left-hand wiper of a self-interrupting stepping switch BRL which can only rest on a blank row, in this case assumed to be row 04 of the roll call board. This ground, through conductor 4 of multiple 314, operates relay RGA of row 04 which, through its upper group of armatures and make contacts 1 to 6, connects the recording indicator units F, IT, IU, AT and AU of row 04 of the roll call board through multiple 129 to the indicator pulsing equipment which includes relays P—1, P—2, P—4 and P—7.

Actuation pulses under the control of the five groups of storage relays FS, ITS, IUS, ATS and AUS of Figs. 1 and 2 transmit the information posted on row 14 of the record board to row 04 of the roll call board, in the following manner. Referring to Figs. 1 and 2, it will be seen that the groups of storage relays FS to AUS, respectively are connected by multiples 125, 126, 127, 238 and 239 to the Fix, identification tens and units, and altitude tens and units recording indicators of the record board. As shown in detail in connection with the FS storage relay group, ground through the wiper and one of the bank contacts of the associated record board indicator F selectively energizes one of the relays 0 to 9 of FS, in the assumed example, relay 8, and through the armature or armatures of the operated relay or relays, one or more of the conductors 1, 6, 11, 16 in a multiple 128, which extends to the armatures of the pulsing relays in Fig. 3, is connected to the conductor 1 in a multiple 129 that extends to the group of armatures 1 to 6 of relays RGA and AG in Fig. 3. Thus, in the example given, conductor 1 of multiple 129 is connected to conductors 6 and 16 in multiple 128, whereby the Fix recording indicator F of the roll call board will be actuated to store the digit 8, by the operation of the distributor DR—1 and the pulsing relays P—2 and P—7.

*Operation of distributor DR—1*

Figure 6:
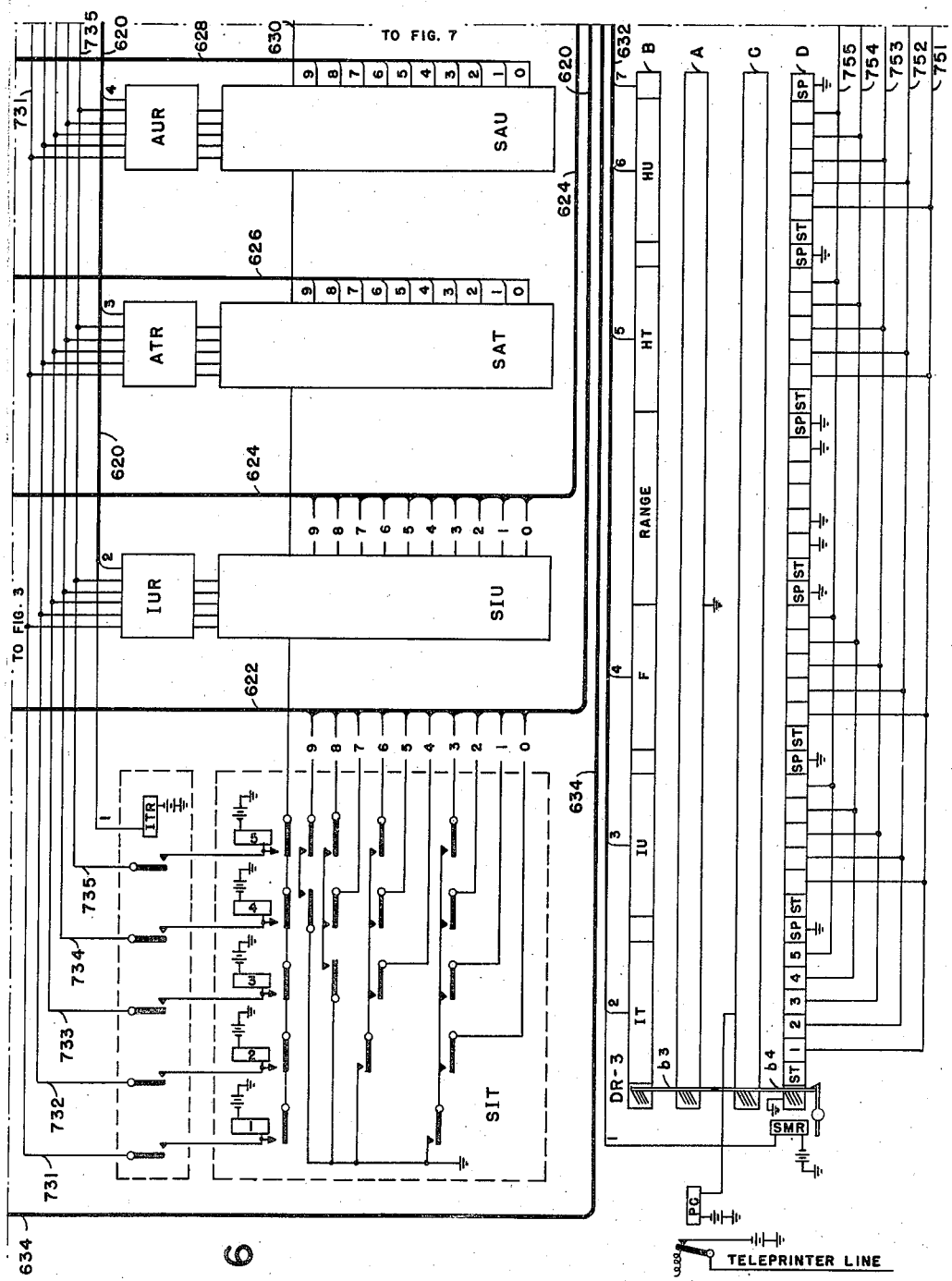
Figs. 6 and 7 show a radio receiver and associated comparison circuits at the control center responsive to the acknowledgment transmitted by the aircraft.
Figure 7:
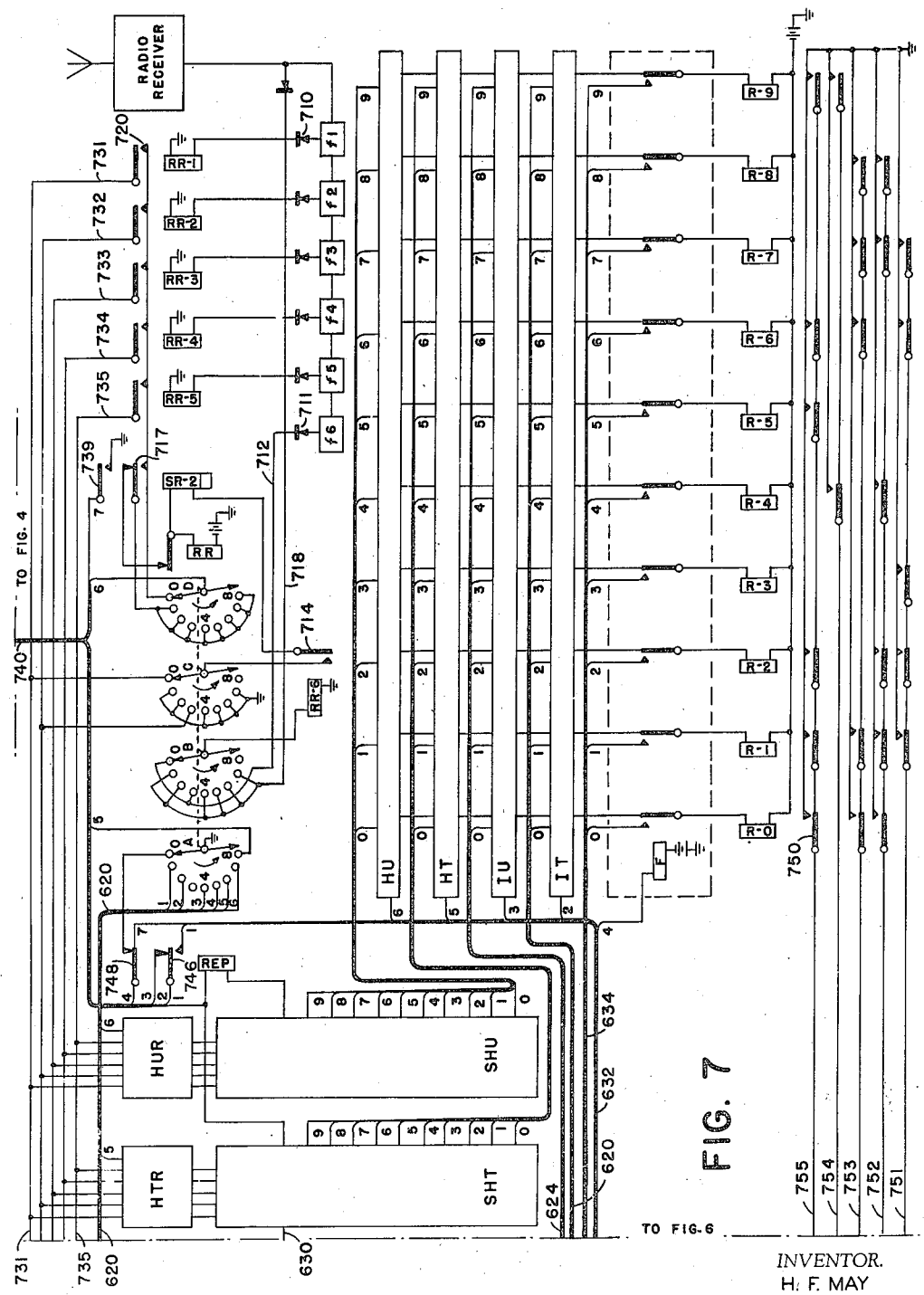

The operation of distributor DR—1 and the pulsing relays in pulsing the selected indicators in the roll call board under control of storage relay groups is generally the same as that for pulsing the record board storage indicators IT to AU of Figs. 6 and 7 of the aforesaid Patent 2,391,469. Ten odd-numbered segments 3 to 23, inclusive, of the segmented ring of the distributor DR—1 are connected together and furnish an operating path for pulsing relay P—1 as the brush b1 of the distributor passes across each of these segments to restore the indicators F to AU of the roll call board to normal prior to the transmission of the resetting pulses. Each time that P—1 operates, battery is applied through the group of make contacts and armatures 322 of relay P—1 and the break contacts and armatures 323 of relay AG, to the conductors 1 to 6 in pulsing multiple 129 and the armatures and make contacts 1 to 6 of relay RGA in row 04, and thence through the windings of the roll call storage indicators F to AU and the indicator S and their switch members s to associated grounds 320. As hereinafter set forth, the indicator S determines the choice of what message is to be sent from the roll call board. The ten pulses generated in passing over segments 3 to 21 of the segmented ring of the distributor DR—1 restore the indicators to their blank positions, in case they were not already resting on blank. As the indicators reach their blank positions the restoration circuit to ground 320 is automatically opened by the indicator switch members s which move to the upper contacts connected to the actuation ground feeder 328, thereby stopping the indicators in this position.

When the brush arm of the distributor reaches segment 22, ground from the solid ring is supplied through the brush to the winding of actuating ground relay AG and thence to grounded battery, causing AG to operate. The operation of AG removes the pulsing battery formerly supplied through its six armatures 323 and break contacts to the pulsing relays, and also supplies ground through its armature 325 and make contact over conductor 326, and armature 327 and make contact of relay RGA in row 04, to the actuation ground feeder 328 for the storage indicators in row 04 of the roll call board. The indicators in row 04 are now in condition to move from their blank positions when actuation or resetting pulses are set over the pulsing multiple.

As brush b1 of distributor DR—1 passes across segment 23 of the segmented ring, the pulsing relay P—1 again is operated, and battery is applied through its group of make contacts and armatures 322 to the associated conductors in cable 128. Let us consider the operation of resetting the Fix storage indicator F of the roll call board in accordance with the example heretofore assumed; no pulse will be applied to indicator F from segment 23 because only relay 8 of the FS storage group of Fig. 1 is operated, and conductor 1 in cable 128 remains open at the FS relay contacts, although any of the remaining indicators of the roll call board which should be stepped once at this time would receive the pulse applied to conductors 2 to 5 in cable 128.

As brush b1 of the distributor passes over segments 25 and 27 of the segmented ring, the pulse relay P—2 is operated twice and, through its make contact and armature 330 causes two pulses from battery to be applied to conductor 6 in multiple 128 and, through the armature and make contact of operated relay 8 in the FS storage relay groups, the two pulses are applied to conductor 1 in pulsing multiple 129, and through the armature and make contact 1 of relay RGA, winding the Fix indicator F in the roll call board, indicator switch member s and actuation ground feeder 328, and cause indicator F to be stepped twice, that is, through its zero position to position 1.

When the distributor brush passes the seven segments 29, 31, 33, 35, 37, 39 and 41 of the segmented ring, the pulse relay P—7 is operated seven times, thereby applying through its upper make contact and armature 332 seven pulses to conductor 16 in the pulsing cable 128, and thence through the armature and make contact of operated relay 8 of the FS storage group, and conductor 1 of multiple 129, causes the storage indicator F in the roll call board to be stepped seven additional steps, the nine pulses thus supplied to the indicator causing it to step past its zero position and come to rest on display position 8. Relay P—4 was operated four times as the distributor brush passed over segments 30, 32, 34 and 36, but had no effect on indicator F.

It will be seen that the combination of 1, 2, 4 and 7 pulses supplied by the pulsing relays form an additive code which enables any number of pulses from 1 to 11 to be produced in accordance with the circuits set up by the FS, ITS, IUS, ATS and AUS storage relay groups, thereby to reset concurrently the storage indicators F to AU of the roll call board to corresponding positions.

So long as ground through the bank M of switch RF, Fig. 2, was operating relay RLS—14, through its armature 242 and make contact, relay 2 was also held operated even though its locking path had been opened at the right-hand break contact and armature 223 of RLS—14. At the end of the pulsing cycle, segment 42 of distributor DR—1 applies ground to conductor 314 and operates the release relay RLS of Fig. 3, and this momentarily removes at armature 310 the ground from conductor 311 and bank M of switch RF. Relay 2 releases, but relay RLS—14 remains locked to contact C of cam 210. Relay 2 at its armature 224, releases relay GS—14. RLS—14 is released only when cam C opens, thereby to prevent multiple transfer to the roll call board of the same flight until the time changes at the end of each minute.

*Transmission from roll call board to aircraft*

The flight in question has now been transferred and posted on the roll call board, and the data in each row of the storage indicators of the roll call board is transmitted automatically in succession via radio at the proper times to all planes tuned to the range transmitter. Preferably, although not necessarily, audio frequencies in permutation code arrangement are employed for transmission, whereby the plane identification and data may be transmitted without interrupting the usual radio range signals. By the provision of an address reading circuit in the plane, only the plane called receives the message intended for it. In the embodiment illustrated herein, two types of transmission are made to the plane, one to transmit a clearance and the other to request an acknowledgment or a report. The plane makes no response to the transmission of a clearance, but in the next roll call cycle a request for an acknowledgment is transmitted This gives the pilot time to acknowledge the receipt of the message by pushing an "Acknowledge" button in the plane. The acknowledgment consists of a repetition of the original message, and in addition a position report is also transmitted if the plane has previously passed a particular Fix or marker. When a report is requested, the same process takes place.

The distributor DR2 of Fig. 4 controls the transmission to the aircraft of the information stored in any row of the roll call board concerning said aircraft. Each time the distributor sends a message it advances the rotary switch RC to the next row in the roll call board desiring to send a message to an aircraft. Whether or not any row in the roll call board desires to send a message is determined by the setting of the storage indicator S of Fig. 4. The indicator S also keeps track of the number of times a given message is sent so that the message stored in a row of the roll call board is sent only a predetermined number of times before giving an alarm either that an acknowledgment or a report, or the case may be, has not been received from the particular aircraft.

The choice of what message is to be sent to the plane is determined by the setting of the S indicator, Fig. 4, which in turn was controlled, over conductor 6 in multiple 129 by the S—2 and S—5 storage relays, Fig. 2, when the roll call board was posted. Preferably, and as disclosed, a report is requested three times and an acknowledgment once before bringing in an alarm.

When the roll call board was posted, armature 334 and make contact of relay RGA, Fig. 3, of row 04 caused the operation of relay BR in row 04 which locked, over conductor 335, to relay RL, Fig. 4, of row 04. When RGA in row 04 released, after the information was stored in row 04, battery was applied through its armature 334 and armature 336 and make contact of relay BR to a multiple lead 1 in multiple 337, thereby energizing RC switch magnet, Fig. 4. The release of relay RGA and the operation of relay BR removed ground from conductor 338, conductor 4 in multiple 420, and terminal 04 of switch bank H of rotary switch RC, Fig. 4, so that the switch will stop at this terminal. During the hunting, relay SR—3 has been operated and this, at its grounded armature 422, held relay B—1 operated. When SR—3 releases, its armature 424 applies ground to the M bank of switch RC and thence over conductor 4 in multiple 440 to operate relay RGS of row 04 in the example assumed. Release of SR—3 also energizes, through its armature 422 and break contact, and make contact and armature 423 of relay B—1, the start magnet SMT of distributor DR—2. The operation of RGS connects, through multiple 337, the wipers of the recording indicator units IT, IU, AT and AU of Fig. 3 to the segments of the ring of the distributor so that the brush b2 in passing over these segments will ground in succession the wipers of the above named recording indicator units.

*Operation of distributor DR—2*

As the distributor brush b2 grounded segment 1, relay CC, Fig. 4, operates and at its armatures and make contacts connects audio frequency oscillators f1, f6, (represented by numbered circles) over conductor 425 to the input of the radio transmitter at the ground station. Any suitable audio frequencies may be employed, and the combinations of these audio frequencies correspond to permutation codes representing the numerals and guard characters comprising the message to be sent to the plane. Thus, f1 and f6 is the "condition" code for conditioning all plane receivers to begin reception, as will be noted from the chart in Fig. 9, i. e., it indicates the beginning of an address.

When the brush b2 of distributor DR—2 grounds segment 2, this ground is extended over conductor 2 of cable 337, through bank terminal 0 of recording unit IT of the roll call board, Fig. 3, and conductor 0 of multiple 342, to operate relay I—0, Fig. 4, which connects the sources of frequencies f1 and f2 (represented by numbered circles) to the radio transmitter. On segment 3 of the distributor DR—2, a similar transmission under control of recording unit IU of row 04 operates relay I—8, Fig. 4, and sends the code for 8 (f3 and f5) through the radio transmitter.

When the brush reaches segment 4 of the distributor DR—2, relay LC operates, and through its armature and make contacts, transmits the "lock" code f2, f6. From segment 5 the distributor sends a code controlled by the recording unit S, Fig. 4, of row 04, which unit holds the C relay operated so long as relay RGS of row 04 is operated. Through the armature and contact of the operated C relay, relay CR is operated, and this transmits the code f6 corresponding to the transmission of clearance. Ground from segment 6 of the distributor DR—2 is applied to conductor 8 of cable 337, and through the left-hand make contact and armature of operated relay C—1, conductor 4 in cable 337, and wiper and contact 0 of the bank of recording unit AT, Fig. 3, and thence through conductor 0 in cable 344, to operate relay A—0 of Fig. 4, thereby to send out the code for 0 under control of relay C—1 and recording unit AT. The code used in this case is f3, f4 and f5. The duration of this character transmission and the succeeding one comprising frequencies f1, f2 and f3 from segment 7 of the distributor DR—2 is longer because these characters are used to set the indicator units in the plane, and they require a longer pulse to permit the plane indicators to reach a final setting in accordance with the data displayed on the recording units AT and AU of Fig. 3.

From segment 8 of distributor DR—2, ground is applied through break contacts 427 and 428 of relays RB and RLC, and conductor 6 of cable 337, to energize the coil of recording unit S, Fig. 4, in row 04 of the roll call board. The same ground, through another break contact 430 of RLC, also energizes, through conductor 431, the magnet of rotary switch RC. When the distributor brush leaves segment 8, the S recording unit advances to the "Acknowledge" position. The wipers of rotary switch RC leave position 04 and the switch buzzes to the next occupied row in the roll call board where another message is to be transmitted to a different plane or planes enroute.

*Operation of plane receiver*

The operation of the plane receiver, Fig. 5, in response to the message just transmitted is as follows. Upon receiving the "condition" code frequencies (*f1* and *f6*), frequency selecting networks *f1* and *f6* located in the audio output of the plane radio receiver passed current, through rectifiers 510 and 511, to operate the receiving relays PR—1 and PR—6, the operating path of PR—6 including conductor 512. The operation of relay PR—6 causes operation of relay A by connecting ground through the make contact and armature 514 of PR—6, bank terminal strap 515, bank terminal 0 and wiper of bank D. Ground from the wiper of bank A of the rotary switch SEL is applied through the armature and make contact 520 of relay PR—1, conductor 522, bank C, and inner make contacts 524 of relay A, and operates the SR—4 relay and rotary selector magnet SEL in series. At the end of this pulse the selector switches SEL in all planes tuned to the incoming radio signals advance their wipers one step from contacts 0 to 1. Relay SR—4 thereafter remains operated so long as the switch receives successive impulses, but will release if one pulse is skipped.

Following the "condition" code *f1* and *f6*, the first digit of the identification is transmitted; this is 0, code *f1*, *f2*. Ground from the wiper of bank A of switch SEL, which is now in position 1, through bank strap 516 and make contacts 517 of the operated SR—4 relay is supplied to the lower outer set of make contacts of relays PR—1 to PR—5. Relay PR—2, which is now operated by code *f2*, extends this ground through conductor 517 and bank D of switch SEL to operate relay A. Relay PR—1 extends this ground through conductor 522 and bank C, and the armature 524 and make contact of relay A, to step the rotary switch SEL. The terminals 1 and 2 on switch banks C and D are connected to the PR relays corresponding to the particular plane's identification, all other planes being connected differently. In a similar manner the reception of the digit 8, which is the second digit of the identification, will again step the switch SEL in the plane designated by the identification number 08, but will fail to do so in other planes. When this happens in the other planes their relays SR—4 release because they do not receive a pulse from the relays corresponding to the identification code which is being received, and remove ground from their relays PR—1 to PR—5, and this connects ground through the interrupter contact to the SEL stepping magnet. The switches in all planes except 08 return to normal by self-interruptions, and since the "condition" code is not sent again, they do not restart.

In plane 08 the switch SEL continues to advance, receiving the identification and "lock" codes. Having passed the selection phase of the message, at contact 4 on switch bank E the winding of relay PR—6 is connected by means of conductor 518 and rectifier 519, as a universal relay to respond to any frequency signal. The armature 524 of relay A also is connected to ground, and with this arrangement any signal arriving after the "lock" code will advance the rotary switch SEL one step per signal.

The next series of signals comprise the message or data to be transmitted. On contact 4, battery from bank B is connected over conductor 525 to the inner make contact of relay PR—3. If the code 3 is received in this position and either the ACK (acknowledgment) or PR (position report) relays in the lower right-hand portion of Fig. 5 are operated, a path will be completed through the inner make contact and armature of relay PR—3, armature 536 and make contact of relay A, conductor 537, make contacts and armatures 538, 539 of relay PR or ACK, and conductor 540 to operate relay BT. This relay starts the plane transmitter to transmit either an acknowledgment or a report. If instead of code 3, code 6 is sent, the rotary switch SEL merely steps beyond this point.

When the selector switch SEL is in position 5, the electromagnet ATR (altitude tens) of the recording indicator unit comprising dial 544 in the plane is connected, by conductor 2 in cable 541 and contact 5 of bank B of switch SEL, to battery. In this position the code for the first character of the data is received and posted. This character in the present example is 0, and the code is *f3*, *f4*, *f5*. When this code is received, the ground present on conductor 522 is connected from relays PR—3, PR—4 and PR—5 to all bank terminals of the recording indicator unit except those terminals in the 0 position. These grounds complete a self-interrupting circuit through the rectifiers 542, 543 and conductors 1 and 3 of multiple 545, and the ATR indicator magnet to buzz the indicator and its dial 544 to its 0 display position. The code pulse is applied for a sufficiently long time to enable the indicator to buzz to any position. At the conclusion of the pulse the selector switch SEL steps to position 6, and the code for positioning the recording indicator unit AUR (altitude units) and its dial 546 is applied. When the pulse ceases, the selector switch SEL steps to its 0 position. If no data was to be sent, as when an acknowledgment is requested, the selector switch SEL would buzz to its 0 position after the "transmit" code had been sent.

*Acknowledgment of message by the aircraft*

Let us take the condition where the plane has received a clearance. The pilot reads the settings of the recording indicator dials 544 and 546 upon which his authorized altitude is now posted. In actual practice additional digits are posted for the pilot's guidance. The pilot then presses the ACK push button which operates the ACK relay. When row 04 in the roll call board at the ground station is again reached, a transmission of the plane's identification followed by the "transmit" code will be sent by the ground transmitter. No data will be transmitted, however, since the C—1 relay, Fig. 4, is unoperated and the conductors 8 and 9 from segments 6 and 7 of the distributor DR—2 are open. The reception of the "transmit" signal by plane 08 will operate its BT relay, Fig. 5, which in turn will step rotary switch TRS off normal. A slow speed self-interrupting circuit will be established through conductor 549 and bank D of switch TRS to continue stepping the switch through its complete cycle. Each time that relay BT operates, its grounded armature 548 and make contact will energize the TRS magnet of the switch and also will energize an oscillator to generate all frequencies $f1-f6$ used for transmitting the acknowledgment, which frequencies are generated by the harmonic generator diagrammatically shown. The required frequencies for each character of the transmission are selected by the position of the TRS switch and the recording indicator units ATR and AUR. The preliminary "condition" code is sent by banks A and B in position 0 of the TRS switch. Following this, the switch steps to position 1 and sends the first digit 0 of the plane identification through the same banks A and B. In a similar manner the next digit of the identification (position 2) and the "locking" code (position 3) are sent. In positions 4 and 5 of the TRS switch the settings of the recording indicator units ATR and AUR are transmitted. If the PR relay had also been operated, the data on the recording plane altimeter would also have been sent in a similar manner.

The PR relay is operated, however, only if the plane has passed over a Fix marker prior to the roll call, since it is operated from the MF relay which in turn is operated by the audio frequency used to modulate the "fix" marker. The Fix signal is transmitted, in known manner, by a highly directive Fix marker transmitter at the Fix ground station, and received by the plane marker receiver. If relay PR is operated, terminals 6 and 7 on bank C of the TRS switch are connected through the armature 548 and make contact of PR and conductor 550 to the plane radio transmitter, Fig. 8.

When the radio signals from the plane are received by the radio receiver, Fig. 7, at the ground receiver station, the reception of the "condition" code steps rotary selector switch RR off normal and successive characters received advance the switch through its cycle. The ground receiver selector operates in a manner similar to the plane receiving selector, but instead of advancing only when a particular identification code is received, the switch RR responds to any identification code. The only requirement to keep the switch stepping is the reception of the "condition" and "lock" codes when the switch is in positions 0 and 3 respectively. As the characters of the identification and the message are received they are stored in relay groups SIT 1—5, SIU 1—5, SAT 1—5 and SAU 1—5, Fig. 6. If a report had also been transmitted it would have been stored in groups SHT 1—5 and SHU 1—5, Fig. 7. Each relay group is connected in succession to relays RR—1 to RR—5, Fig. 7, through associated cut-in relays ITR, IUr, ATR, HUR, HTR and HUR which are operated successively over conductors 1 to 6 in cable 620 by the grounded wiper and contacts 1–6 of bank A of switch RR.

It will be recalled that transmission started when the distributor DR—2, Fig. 2, reached segment 5. The receipt of the "condition" code from the plane operates the SR—2 relay, Fig. 7, associated with selector switch RR. Ground from armature 739 of the SR—2 is applied to conductor 7 in cable 740 and operates relay RB, Fig. 4, opening, at armature 437 of the latter relay, the circuit from segment 8 of the distributor DR—2. Consequently, if the plane responds to the request to transmit, the release pulse from segment 8 of the distributor is interrupted and switch RC continues to hold row 04 in the roll call board.

As each received character is set up in the storage relay groups SIT to SHU of Figs. 6 and 7, ground is applied to one of the conductors 0 to 9 in multiples 622 to 628 leading from the groups corresponding to the characters received. The leads from the storage group contacts are multipled to the banks of the corresponding recording units in the roll call board. Thus, group SIT 1—5 is multipled to the banks of the IT recording units in all rows of the roll call board. Assuming that the first message received by the plane had been CC, 0, 8, LC, T$rs$, the plane would have sent back CC, 0, 8, LC, 0, 9 if the PR relay, Fig. 5, had been unoperated. The receipt of this message by the ground receiver would have resulted in energizing the 0 conductor in multiple 622 of the SIT 1—5 group, conductor 8 in multiple 624 of the SIU 1—5 group, the 0 conductor in multiple 626 of the SAT 1—5 group and conductor 9 in multiple 628 of the SAU 1—5 group. The lead 0 from the SIT 1—5 group finds a path through the B bank of the IT recording unit in row 04, Fig. 3, and operates relay ITC in that row. Similarly, if an exact duplication of the first message is received from the plane, relays IUC, ATC and AUC will be operated in row 04. A series comparison circuit will be established through the armatures and make contacts of relays ITC and IUC from ground 350 at the TT storage unit through the RGS relay contacts, conductor 352, armature and make contact of relay AK, conductor 353, armatures and make contacts of relays ATC and AUC, and conductor 351 to the winding of the RL relay, Fig. 4, of row 04. The AK relay armature and make contact is in this circuit because the AK relay has been operated from bank B of recording unit S, Fig. 4, which had advanced to terminal 1 after transmitting the first message. When relay RL operates, it operates relay RLC through conductor 7 in cable 337. This occurs when rotary switch RR, Fig. 7, had reached position 5 if the received message agrees with the information in the roll call board.

When rotary switch RR passes position 8, ground from relay REP is supplied through bank A, conductor 5 in cable 740, armature 430 and make contact of RLC, Fig. 4, conductor 2 in cable 740, break contact of relay REP, Fig. 7, conductor 3 in cable 740, conductor 431, Fig. 4, conductor 1 of cable 337, armature 336 and make contact of relay BR, Fig. 3, and break contact and armature 334 of relay RGA to battery, to advance the rotary switch RC, Fig. 4, off row 04. When the switch RR, Fig. 7, reaches position 0 the relay BRS, is operated, releasing relay groups SIT 1—5, etc., of Fig. 6, which are locked up over conductor 635, and relay RLC, Fig. 4, which was locked up over conductor 436.

If agreement had not occurred between the received message and the data in the roll call board, relay RLC would not have operated. When switch RR of Fig. 7 reached position 8, ground would have been sent through the armature 430 and break contact of RLC to advance switch RC and the S recording unit to position 2. In this position an alarm lamp ALM would have been lit, and the terminal 04 on bank H of rotary switch RC would have been made busy from battery on conductor 4 of multiple 420, so the switch RC would not again stop in this position. An attendant responding to the alarm would contact the plane by voice, and having cleared up the situation would release relay BR, Fig. 3, by manually operating relay RL, Fig. 4. This would make row 04 available for a new roll call posting.

If a report had been received in addition to the acknowledgment, the report data would have been taken from the contacts of the plane altimeter, Fig. 5, which is recording altitude 20 in this example. The figure 20 would have been stored in the relays of groups SHT and SHU, Fig. 7. The presence of locked up relays in SHU would operate the low resistance series relay REP connected to the locking lead 630. This relay, at its armature 748 and break contact, opens the circuit 4 of relay BRS, Fig. 4, and when switch RR, Fig. 7, passes terminal 8 a circuit is established to energize the start magnet SMR of distributor DR—3, Fig. 6, provided relay RLC is operated over conductor 1 in cable 632, armature 746 and make contact of relay REP, conductor 2 in cable 743, and make contact of armature 430 of relay RLC, conductor 5 in cable 740, and terminal 8 of bank A of switch RR. If RLC has not been operated recording unit S is advanced to the alarm position and switch RC is advanced.

Distributor DR—3

When distributor DR—3 of Fig. 6 goes through its cycle, the data stored in relay groups SIT, SIU, SHT and SHU are transmitted over a teleprinter circuit to the incoming line equipment shown in the aforesaid patents. The method of posting the data is the same as that employed for posting any other incoming data. Such messages are in the form Ident tens, Ident units, Fix, Range, Data tens and Data units. The Ident and Data are taken from the above mentioned storage relay groups. The Fix is taken from the F recording unit of the roll call board, Fig. 3.

Local rings A and B of distributor DR—3 operate through conductors 2 to 6 in cable 632, to cut in the relays IT, IU, F, HT and HU of Fig. 7 in succession. The range to be posted is always the H (actual altitude) range so this code (1, 2, 5) is permanently wired on the line circuit ring D. The operation of a cut-in relay, as shown by relay F in Fig. 7, connects the ten leads from the associated storage group to a group of translating relays R—0 to R—9, the armature 750 and make contacts of which apply the corresponding five unit teleprinter code to the distributor ring D. The grounds applied to the segmented ring D control, through brush b4 and solid ring C, the transmitting line relay PC which interrupts the line to transmit marking and spring start-stop signals to the teleprinter line.

At the end of the distributor cycle, ground is applied through segment 7 of ring B to the BRS relay, Fig. 4. This relay releases the locked-up storage groups of Figs. 6 and 7 and also the relay REP. REP deenergizes and at its armature 748 and break contact, restores the circuit from ground on bank A of switch RR to the winding of relay BRS which remains operated. The operation of BRS also releases RLC and closes the buzzing circuit of switch RC. If any other rows in the roll call board are awaiting transmission, switch RC proceeds to these rows and the roll call cycle continues.

Whenever a row of the roll call board is in use, or has data stored therein awaiting transmission, its relay BR, Fig. 3, is locked up, and the row finder switch BRL cannot select the busy row because ground from the outer left-hand armature and make contact of BR is applied to a conductor, such as conductor 4, in multiple 308, and causes a ground potential to be maintained on the corresponding terminal of the BRL switch bank, thereby causing the switch BRL to buzz past such row and select the next available idle row.

Various modifications of the circuit arrangements and apparatus shown, and various equivalents or substitutes for the devices illustrated, will occur to those versed in the art without departing from the spirit and scope of the present invention. The disclosure, therefore, is for the purpose of illustrating the principles of the invention which is not to be regarded as limited except as indicated by the scope of the appended claims.

What is claimed is:

1. A system for posting and retransmitting information regarding the movements of aircraft, comprising an assembly of flight progress posting apparatus having signal storage elements respectively assignable to different flights for storing information in regard thereto, said information comprising flight identification indicia and control data including predicted times when individual aircraft should reach a certain geographical location along their respective flight routes, and means including a signal transmitter for automatically transmitting successively to the respective aircraft at particular times as determined by said posted predicted times, signals comprising their individual flight identification indicia and certain of the control data posted on said flight posting apparatus.

2. A system for posting and retransmitting information regarding the movements of aircraft, comprising an assembly of flight progress posting apparatus embodying a plurality of groups of signal storage devices, assignable to different ones of said aircraft, and actuatable to different settings for storing the aircraft identification indicia and control data in regard thereto, and means for automatically initiating transmission at predetermined times to said aircraft of flight identification signals and posting signals comprising certain of said data stored on the flight progress posting apparatus, said identification signals being of such character as to lock out the reception of their accompanying posting signals by those of said aircraft which have different identification signals.

3. A system for posting information regarding the movements of aircraft, comprising an assembly of flight progress posting apparatus embodying a plurality of groups of signal storage devices, assignable to different ones of said aircraft, and actuatable to different settings for storing control data in regard thereto, means for automatically initiating transmission at predetermined times to said aircraft of posting signals comprising certain of the data stored on the flight progress posting apparatus, said aircraft each having receiving apparatus including an indicator device responsive only to such of said posting signals as pertinent to its particular flight, thereby to visually display said data as received.

4. A system for posting information regarding the movements of aircraft, comprising an assembly of flight progress posting apparatus embodying a plurality of groups of signal storage devices, assignable to different ones of said aircraft, and actuatable to different settings for storing the aircraft identification indicia and control data in regard thereto, means controlled by a selected group of said storage devices for automatically initiating transmission at predetermined times to a corresponding aircraft of its flight identification signals and posting signals comprising certain of said data stored on the flight progress posting apparatus, said aircraft having receiving apparatus selectively responsive to its flight identification signals and an indicator device responsive to the posting signals which accompany its flight identification signals for visually displaying the received data.

5. A system for posting information regarding the movements of aircraft, comprising an assembly of flight progress posting apparatus embodying a plurality of groups of signal storage devices, assignable to different ones of said aircraft, and actuatable to different settings for storing control data in regard thereto, means for automatically transmitting to said aircraft posting signals comprising certain of said data stored on the flight progress posting apparatus, said aircraft having receiving apparatus including an indicator device responsive to the posting signals for visually displaying the received data, and means in said aircraft for initiating an acknowledgment of the received message comprising means controlled by the settings of the aircraft indicator device for transmitting the data displayed thereon.

6. A system for posting information regarding the movements of aircraft, comprising an assembly of flight progress posting apparatus embodying a plurality of groups of signal storage devices, assignable to different ones of said aircraft, and actuatable to different settings for storing the aircraft identification indicia and control data in regard thereto, means for automatically transmitting to said aircraft flight identification signals and posting signals comprising certain of said data stored on the flight progress posting apparatus, said aircraft having receiving apparatus selectively responsive to the flight identification signals and an indicator device responsive to the posting signals for storing and visually displaying the received data, and means in said aircraft for transmitting an acknowledgment of the received message comprising means for transmitting the flight identification signals and means controlled by the settings of the aircraft indicator device for transmitting the data displayed thereon.

7. A system for posting information regarding the movements of aircraft, comprising an assembly of flight progress posting apparatus embodying a plurality of groups of signal storage devices, assignable to different ones of said aircraft, and actuatable to different settings for storing the aircraft identification indicia and control data in regard thereto, means for automatically transmitting to said aircraft flight identification signals and posting signals comprising certain of said data stored on the flight progress posting apparatus, said aircraft having receiving apparatus selectively responsive to the flight identification signals and an indicator device responsive to the posting signals for storing and visually displaying the received data, means in said aircraft for transmitting an acknowledgment of the received message comprising means for transmitting the flight identification signals and means controlled by the settings of the aircraft posting indicator device for transmitting the data displayed thereon, and means associated with said flight progress posting apparatus for receiving and automatically comparing the acknowledgment from the aircraft with the message transmitted thereto.

8. A system for posting information regarding the movements of aircraft, comprising an assembly flight progress posting apparatus embodying a plurality of groups of signal storage devices, assignable to different ones of said aircraft, and actuatable to different settings for storing the aircraft identification indicia and control data in regard thereto, means for automatically transmitting to said aircraft flight identification signals and posting signals comprising certain of said data stored on the flight progress posting apparatus, said aircraft having receiving apparatus selectively responsive to the flight identification signals and an indicator device responsive to the posting signals for storing and visually displaying the received data, means in said aircraft for transmitting an acknowledgment of the received message comprising means for transmitting the flight identification signals and means controlled by the settings of the aircraft posting indicator device for transmitting the data displayed thereon, means associated with said flight progress posting apparatus for receiving and automatically comparing the acknowledgment from the aircraft with the message transmitted thereto, and means controlled by said comparison means for automatically retransmitting said message to the aircraft in the event of disagreement between the message and said acknowledgment.

9. A system for posting and retransmitting infomation regarding the movements of a plurality of aircraft, comprising an assembly of flight progress posting apparatus embodying a plurality of groups of signal storage devices, assignable to different ones of said aircraft, and actuatable to different settings for storing the aircraft identification indicia and control data in regard thereto, and means controlled by respectively different groups of said storage devices for automatically initiating transmission successively at predetermined times to each of said aircraft of their respective flight identifications signals and currently stored posting signals comprising certain of said data pertinent thereto, said identification signals being effective when received by the aircraft to which they do not correspond for locking out the reception of their accompanying posting signals by such aircraft.

10. A system for posting and retransmitting information regarding the movements of aircraft, comprising an assembly of flight progress posting apparatus embodying a plurality of groups of signal storage devices, assignable to different ones of said aircraft and different Fix designations, and actuatable to different settings for storing the aircraft identification indicia, Fix designation and data in regard thereto, and means for automatically initiating transmission to a particular aircraft at the time when it should have reached a certain location in its flight with respect to a particular Fix along the flight route, of its flight identification signals and posting signals comprising certain of said data pertinent thereto and currently stored on the flight progress posting apparatus.

11. A system for posting and retransmitting information regarding the movements of aircraft, comprising an assembly of flight progress posting apparatus having signal storage devices respectively assignable to different flights for storing aircraft identification indicia and control data relative thereto, said control data including predicted times when individual aircraft should reach a certain geographical location along their respective flight routes, means including a chronological member for selecting said storage devices sequentially according to the predicted times stored therein, a signal transmitter, and means operative under control of said chronological member for causing said transmitter to transmit messages including said identification indicia and certain of said control data as derived from the selected storage devices.

12. A system for posting and retransmitting information regarding the movements of aircraft, comprising an assembly of flight progress posting apparatus embodying a plurality of groups of signal storage devices, assignable to different ones of said aircraft, and actuatable to different settings for storing control data in regard thereto, and means for automatically initiating transmission at predetermined times to said aircraft of posting signals comprising certain of the data stored on the flight progress posting apparatus, said means including a chronological recording device and associated circuit means for comparing the time data currently stored in said signal storage devices with the time recorded by said chronological device.

13. A system for posting and retransmitting information regarding the movements of aircraft, comprising an assembly of flight progress posting apparatus embodying a plurality of groups of signal storage devices, assignable to different ones of said aircraft, and actuatable to different settings for storing control data in regard thereto, and means for automatically initiating transmission at predetermined times to said aircraft of posting signals comprising certain of the data stored on the flight progress posting apparatus, a plurality of chronological devices respectively recording different times, associated circuit means for comparing the time data currently stored in said signal storage devices with the different times recorded by said chronological devices, and means controlled by said chronological devices for determining which of said data shall be transmitted.

14. A system for posting and retransmitting information regarding the movements of aircraft, comprising an assembly of flight progress posting apparatus embodying a plurality of groups of signal storage devices, assignable to different ones of said aircraft, and actuatable to different settings for storing control data in regard thereto, said control data including the predicted times when individual aircraft should reach a certain geographical location along their respective flight routes, an assembly of roll call apparatus embodying a plurality of groups of signal storage devices actuatable to different settings for storing different control data respectively in regard to a plurality of said aircraft, means controlled by said flight progress posting apparatus for automatically posting on said roll call apparatus in the sequence of said predicted times certain of the data stored on the flight progress posting apparatus, and means for automatically transmitting selectively to said aircraft their respective posting signals comprising the data stored on the roll call apparatus.

15. A system for posting and retransmitting information regarding the movements of aircraft, comprising an assembly of flight progress posting apparatus embodying a plurality of groups of signal storage devices, assignable to different ones of said aircraft, and actuatable to different settings for storing control data in regard thereto, said control data including the predicted times when individual aircraft should reach a certain geographical location along their respective flight routes, an assembly of roll call apparatus embodying a plurality of groups of signal storage devices actuatable to different settings for storing different control data respectively in regard to a plurality of said aircraft, means controlled by said flight progress posting apparatus for automatically posting on said roll call apparatus in the sequence of said predicted times certain of the data stored on the flight progress posting apparatus pertinent to selected ones of the aircraft, and means for automatically transmitting successively and selectively to said aircraft their respective posting signals comprising the data stored on the roll call apparatus.

16. A system for posting information regarding the movements of aircraft, comprising an assembly of flight progress posting apparatus embodying a plurality of groups of signal storage devices, assignable to different ones of said aircraft, and actuatable to different settings for storing the aircraft identification indicia and control data in regard thereto, means for automatically transmitting to a selected one of said aircraft its individual flight identification signals and signals comprising a request for a report from the aircraft, said aircraft having receiving apparatus selectively responsive only to its individual flight identification signals and a settable device for storing electrical signal conditions comprising a report, means in said aircraft for transmitting said report comprising means for transmitting its individual flight identification signals and means controlled by the settings of the aircraft signal storage device for transmitting signals comprising the report data stored therein.

17. A system for posting information regarding the movement of aircraft, comprising an assembly of flight progress posting apparatus embodying a plurality of groups of signal storage devices, assignable to different ones of said aircraft, and actuatable to different settings for storing the aircraft identification indicia and control data in regard thereto, means for automatically transmitting to said aircraft flight identification signals and signals comprising a request for a report from the aircraft, said aircraft having receiving apparatus selectively responsive to the flight identification signals and a settable device for storing electrical signal conditions comprising a report, means in said aircraft for transmitting said report comprising means for transmitting the flight identification signals and means controlled by the settings of the aircraft signal storage device for transmitting signals comprising the report data stored therein, and means associated with the flight progress posting apparatus and responsive to said report signals for resetting selected ones of the first named signal storage devices in accordance with the data in the received report.

18. A system for posting information regarding the movements of aircraft, comprising an assembly of flight progress posting apparatus embodying a plurality of groups of signal storage devices, assignable to different ones of said aircraft, and actuatable to different settings for storing the aircraft identification indicia and control data including the estimated times at which the aircraft will have reached a particular zone along the flight path, means for automatically transmitting Fix marker signals across the flight path, means for automatically transmitting to said aircraft flight identification signals and signals comprising a request for a report from the aircraft at a predetermined time relative to said estimated time, said aircraft having a transmitter and receiving apparatus selectively responsive to the flight identification, request and Fix marker signals and a settable device for storing electrical signal conditions comprising a report, means in said aircraft for conditioning the aircraft transmitter upon receipt of a Fix marker signal by the receiving apparatus, means for automatically initiating transmission of a report by said aircraft transmitter upon receipt of the flight identification and request signals, and means comprising a ground receiver for receiving said report and posting the same on said flight progress posting apparatus.

HAROLD F. MAY.

REFERENCES CITED

The following references are of record in the file of this patent:

UNITED STATES PATENTS

| Number | Name | Date |
|---|---|---|
| 1,894,019 | Buckley | Jan. 10, 1933 |
| 1,973,096 | Norton | Sept. 11, 1934 |
| 2,082,550 | Powell | June 1, 1937 |
| 2,171,293 | Plastino | Aug. 29, 1939 |
| 2,177,400 | Almquist | Oct. 24, 1939 |
| 2,246,449 | Marshall | June 17, 1941 |
| 2,252,083 | Luck | Aug. 12, 1941 |
| 2,386,743 | May | Oct. 9, 1945 |
| 2,399,738 | Howe | May 7, 1946 |